(12) United States Patent
Geisberger

(10) Patent No.: US 10,209,070 B2
(45) Date of Patent: Feb. 19, 2019

(54) MEMS GYROSCOPE DEVICE

(71) Applicant: FREESCALE SEMICONDUCTOR, INC., Austin, TX (US)

(72) Inventor: Aaron A. Geisberger, Austin, TX (US)

(73) Assignee: NXP USA, Inc., Austin, TX (US)

( * ) Notice: Subject to any disclaimer, the term of this patent is extended or adjusted under 35 U.S.C. 154(b) by 225 days.

(21) Appl. No.: 15/172,429

(22) Filed: Jun. 3, 2016

(65) Prior Publication Data

US 2017/0350701 A1    Dec. 7, 2017

(51) Int. Cl.
*G01C 19/574* (2012.01)
*G01C 19/5747* (2012.01)

(52) U.S. Cl.
CPC .................. *G01C 19/5747* (2013.01)

(58) Field of Classification Search
CPC ..................................... G01C 19/574
USPC ........................................ 73/504.12
See application file for complete search history.

(56) References Cited

U.S. PATENT DOCUMENTS

| 8,443,668 B2 * | 5/2013 | Ohms ................ | G01C 19/5747 73/504.12 |
| 8,549,919 B2 * | 10/2013 | Gunthner ............ | G01C 19/574 73/504.14 |
| 8,789,416 B2 | 7/2014 | Rocchi | |
| 8,794,067 B2 * | 8/2014 | Schmid ................ | G01C 19/574 73/504.12 |
| 8,813,564 B2 | 8/2014 | Acar | |
| 8,833,162 B2 | 9/2014 | Seeger et al. | |
| 8,950,257 B2 | 2/2015 | Cazzaniga et al. | |
| 2013/0328139 A1 | 12/2013 | Acar | |
| 2014/0116135 A1 | 5/2014 | Cazzaniga et al. | |

FOREIGN PATENT DOCUMENTS

EP        2846132 A1        3/2015

OTHER PUBLICATIONS

Prandi et al., "A Low-Power 3-Axis Digital-Output MEMS Gyroscope with Single Drive and Multiplexed Angular Rate Readout," ISSCC 2011, Session 6, Sensors & Energy Harvesting 6.1, 3 pages.
Seeger et al., "Development of High-Performance, High-Volume Consumer MEMS Gyroscopes," http://robotics.eecs.berkeley.edu/~pister/147fa14/Papers/Nasiri.pdf, 5 pages.

* cited by examiner

*Primary Examiner* — John E Chapman, Jr.

(57) ABSTRACT

A microelectromechanical system (MEMS) gyroscope device includes a substrate having a surface parallel to a plane; first and second proof masses driven to slide back and forth past one another in a first directional axis of the plane, where the first and second proof masses respectively have a first and second recess in a respective side closest to the other proof mass; a pivot structure coupled to the first proof mass within the first recess and to the second proof mass within the second recess; an anchor between the first and second recesses and coupled to a mid-point of the pivot structure; and third and fourth proof masses driven to move toward and away from one another in a second directional axis of the plane that is perpendicular to the first directional axis; where the proof masses move in response to angular velocity in one or more directional axes.

15 Claims, 11 Drawing Sheets

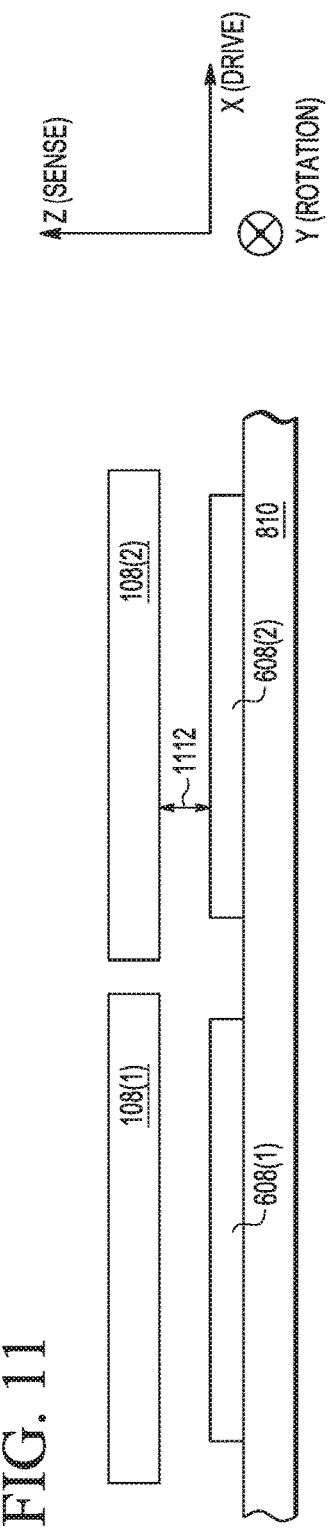
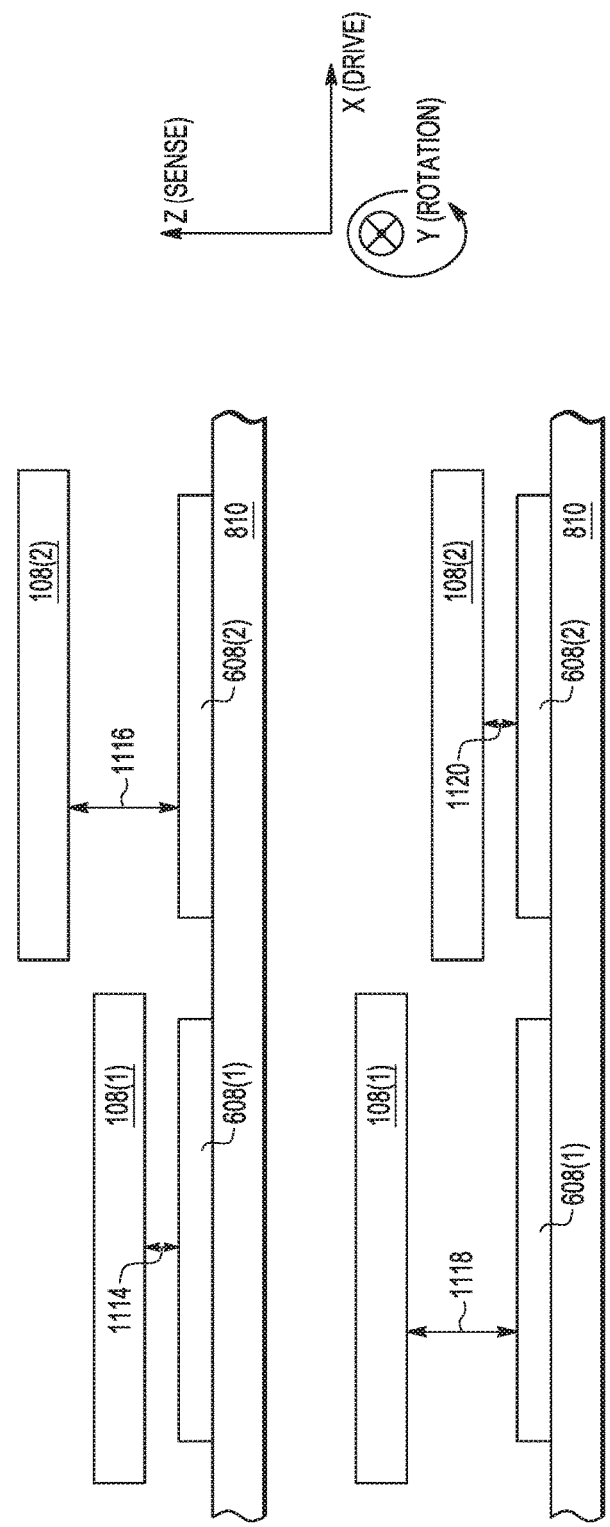

MEMS GYROSCOPE DEVICE

BACKGROUND

Field

This disclosure relates generally to microelectromechanical systems (MEMS), and more specifically, to a MEMS device having a drive structure movable in three axes.

Related Art

Microelectromechanical systems (MEMS) devices are widely used in applications such as automotive, inertial guidance systems, household appliances, protection systems for a variety of devices, and many other industrial, scientific, and engineering systems. Such MEMS devices maybe used to sense a physical condition such as acceleration, angular velocity, pressure, or temperature, and to provide an electrical signal representative of the sensed physical condition. MEMS sensor designs are highly desirable for operation in high gravity environments and in miniaturized devices, and due to their relatively low cost.

BRIEF DESCRIPTION OF THE DRAWINGS

The present invention may be better understood, and its numerous objects, features, and advantages made apparent to those skilled in the art by referencing the accompanying drawings.

FIGS. 8, 9, 11, and 12 illustrate block diagrams depicting cross-sectional views of example proof mass movement in a MEMS device in which the present disclosure is implemented, according to some embodiments.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

Figure 1:
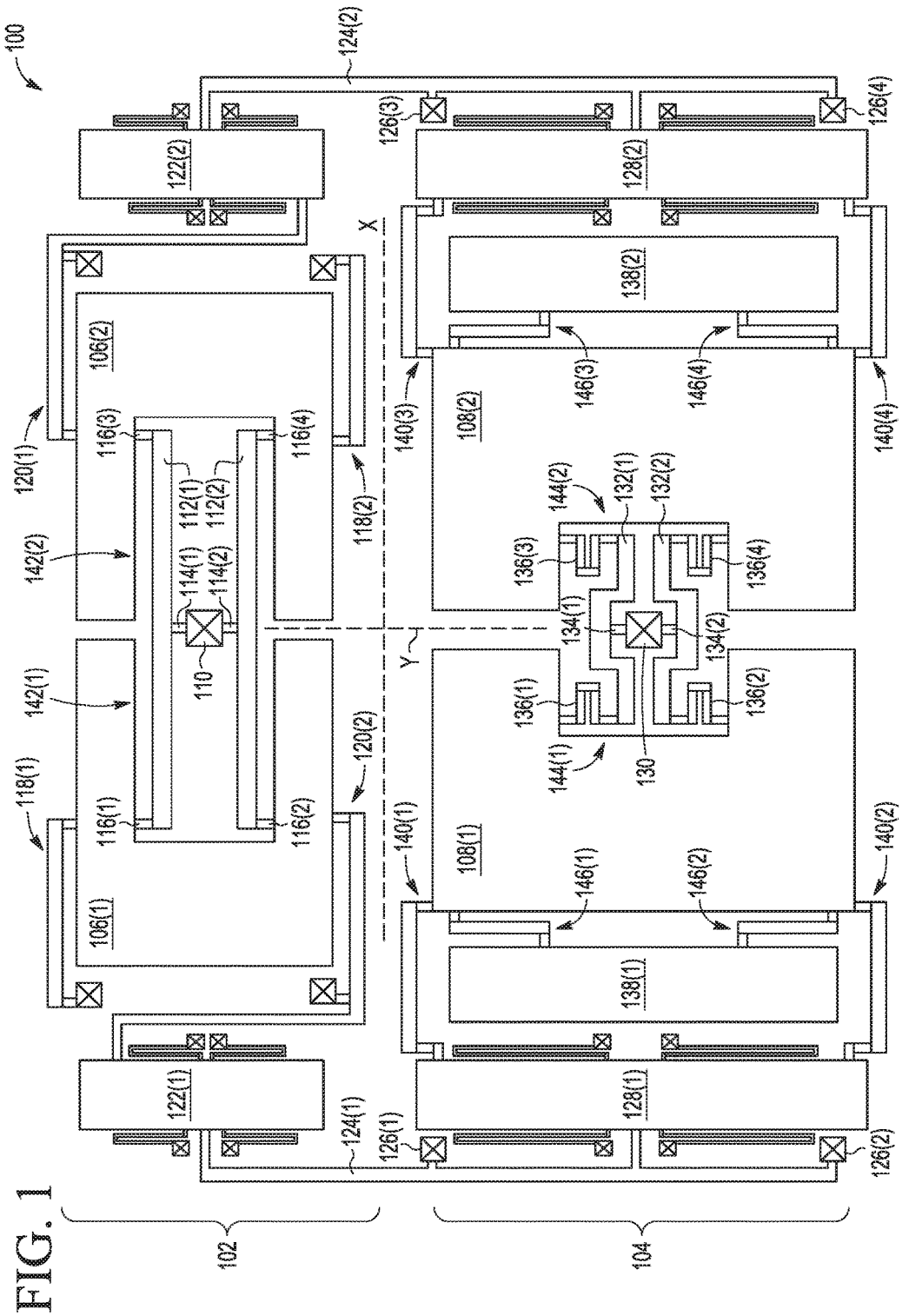
FIG. 1 illustrates a block diagram depicting a top-down view of an example MEMS device in which the disclosure is implemented, according to some embodiments.

The following sets forth a detailed description of various embodiments intended to be illustrative of the invention and should not be taken to be limiting.

Overview

One particular type of microelectromechanical systems (MEMS) device that is used in a variety of applications is a gyroscope. Typically, a MEMS gyroscope includes (among other component parts) one or more movable elements, also referred to as proof masses. In an example MEMS device, a proof mass is resiliently suspended above a substrate by one or more compliant torsion springs and is driven by a frequency to vibrate in a given direction, referred to herein as the drive direction. When the proof mass experiences angular velocity, or rotation about an axis (also referred to herein as the rotation direction), that is perpendicular to the drive direction, the torsion springs enable movement of the proof mass in a sense direction that is orthogonal to the drive direction and the rotation direction. Generally, electrodes are placed to detect the movement of the proof mass in the orthogonal sense direction. For example, as the proof mass moves closer or farther away from an electrode, the capacitance between the proof mass and the electrode changes, which is measured and may then be converted into an electrical signal having a parameter magnitude (e.g., voltage, current, frequency, etc.) that is proportional to the movement in the rotation direction.

The present disclosure provides embodiments of a MEMS gyroscope device that is movable in three axes to measure angular velocity in three axes. The present disclosure provides for two pairs of proof masses that are parallel to a plane of a surface of an underlying substrate (e.g., the two pairs of proof masses lie in-plane). The first pair of proof masses are driven to slide back and forth past one another in a first in-plane directional axis (e.g., in the Y-directional axis), while the second pair of proof masses are driven to move toward and away from one another (e.g., tuning fork vibration) in a second in-plane directional axis (e.g., in the X-directional axis) perpendicular to the first in-plane directional axis. It is noted that the drive motion of each proof mass relative to one another in a given pair is in anti-phase, or in opposing directions from one another (e.g., one proof mass of the pair moves in a positive direction of a directional axis, while the other proof mass of the pair moves in a negative direction of the directional axis).

As the first pair of proof masses experience angular velocity in the second in-plane directional axis, the first pair of proof masses move in an out-of-plane directional axis (e.g., in the Z-directional axis) that is orthogonal to the first and second in-plane directional axes. As the second pair of proof masses experience angular velocity in the first in-plane directional axis, the second pair of proof masses move in the out-of-plane directional axis. As the second pair of proof masses experience angular velocity in the out-of-plane directional axis, the second pair of proof masses move in the first in-plane directional axis.

In some embodiments, the present disclosure also provides for structures to reduce or suppress common mode drive motion, including pivot structures and several four bar linkages, as further discussed below. These structures improve the sense efficiency of the MEMS gyroscope device, where the structures maintain a substantially parallel orientation of a proof mass to an underlying electrode. In some embodiments, the present disclosure also provides for linking bars that couple the in-plane drive motion of the first pair of proof masses with the in-plane drive motion of the second pair of proof masses. In some embodiments, the present disclosure also provides that in-plane drive motions of the proof masses have a single drive frequency. In this manner, the present disclosure provides embodiments of a MEMS gyroscope device that has a compact design due in part to the drive motion of the pairs of proof masses being in perpendicular in-plane directions and the sense motion of the pair of proof masses for two axes in an orthogonal out-of-plane direction.

EXAMPLE EMBODIMENTS

FIG. 1 illustrates a block diagram depicting a top-down view of an example MEMS device 100 including a gyroscope (also referred to as a MEMS gyroscope device 100) in which the disclosure is implemented. In the embodiment shown, MEMS device 100 includes two pairs of proof masses 106(1)-(2) and 108(1)-(2), actuators 122(1)-(2) and 128(1)-(2), sense structures 138(1)-(2), and various structures including torsion springs (also referred to as springs), bars (which may be straight bars or bent bars like an L-shaped or 90° bent bar, a 45° bent bar, or bars bent at other degree angles), and anchors, as further discussed below. MEMS device 100 also includes sense electrodes, which are further discussed in connection with FIG. 5-13. Other embodiments of a MEMS gyroscope device may also include different or additional embodiments of structures, such as pivot structures and common mode drive spring structures, which are further discussed in connection with FIG. 2-4. Additional or fewer components may be present in other embodiments.

Figure 8:
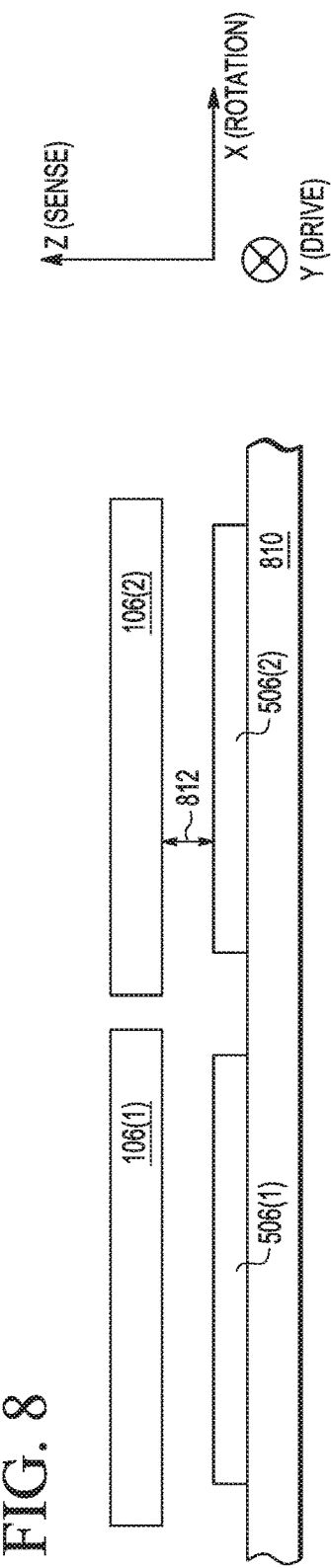

The components of a MEMS device, like the embodiment shown in FIG. 1, are formed on and over a surface of a substrate (e.g., shown as 810 in FIG. 8). The substrate may be implemented as a semiconductor substrate, which can be any semiconductor material or combinations of materials, such as gallium arsenide, silicon germanium, silicon-on-insulator (SOI), silicon, monocrystalline silicon, the like, and combinations of the above. The components of a MEMS device, like the embodiment shown in FIG. 1, may be produced by utilizing current and upcoming micromachining techniques of depositing, patterning, etching, and the like. It is noted that while the components of a MEMS gyroscope device discussed herein may be illustrated as separate components, it should be understood that such components may be formed from a single block of semiconductor material (which may be formed by one or more layers of semiconductor material) and do not necessarily have physical borders or boundaries delimiting one component from another at an illustrated connection point or junction. One component that is "attached" to another component may also be referred to as being "connected" or "joined" to another component at the illustrated connection point or junction. It should be further understood that the use of relational terms, if any, such as first and second, top and bottom, and the like are used to distinguish one from another entity or action without necessarily requiring or implying any actual such relationship or order between such entities or actions.

The substrate surface is parallel to an X-Y plane having an X-directional axis and a perpendicular Y-directional axis. It is noted that "in-plane" movement refers to movement relative to the X- and Y-directional axes, while "out-of-plane" movement refers to movement relative to a Z-directional axis that is normal to the x-y plane. The X-Y plane is parallel to the page of FIG. 1, while the Z-directional axis is normal to the page of FIG. 1.

In some embodiments, proof masses may also have openings or holes formed through them (e.g., in an out-of-plane direction) to ensure that an etchant reaches one or more sacrificial layers under the proof masses during production of a MEMS device like that shown in FIG. 1, where the etchant removes the sacrificial layer(s) and structurally releases the components of the MEMS device.

Proof masses 106(1)-(2) and 108(1)-(2) are each positioned in space above the surface of the substrate and are each parallel to the X-Y plane. Proof mass 106(1) is laterally adjacent to proof mass 106(2) in the X-Y plane, and proof mass 108(1) is laterally adjacent to proof mass 108(2) in the X-Y plane. It is noted that "laterally adjacent" proof masses indicates that the two proof masses are next to one another without an intervening proof mass between them. In some embodiments, proof masses 106(1)-(2) and 108(1)-(2) lie in a common plane that is parallel to the substrate surface (as well as to the X-Y plane discussed above).

In the embodiment shown in FIG. 1, the pair of proof masses 106(1)-(2) are also laterally adjacent to the pair of proof masses 108(1)-(2) in the X-Y plane. For example, each proof mass is illustrated as being in a respective quadrant of the X-Y plane, where proof masses 106(1) and 108(1) are laterally adjacent to one another, and proof masses 106(2) and 108(2) are laterally adjacent to one another. Put another way, as viewed from a top-down view like that shown in FIG. 1, each proof mass has a side closest to its paired proof mass and a perpendicular side closest to one of the other pair of proof masses. For example, proof mass 106(1) has a first side closest to its paired proof mass 106(2) (shown as a side parallel to the positive Y-directional axis) and a second side closest to proof mass 108(1) (shown as a side parallel to the negative X-directional axis), where the second side is perpendicular to the first side. Similarly, proof mass 108(2) has a first side closest to its paired proof mass 108(1) (shown as a side parallel to the negative Y-directional axis) and a second side closest to proof mass 106(2) (shown as a side parallel to the positive X-directional axis), where the second side is perpendicular to the first side.

Proof masses 106(1)-(2) and 108(1)-(2) are known quantities of mass that are used to detect angular velocity, or rotation about an axis, in one or more directional axes. In the embodiment shown in FIG. 1, proof masses 106(1)-(2) detect angular velocity in the X-directional axis (which is further discussed below in connection with FIG. 7-9), while proof masses 108(1)-(2) detect angular velocity in the Y- and Z-directional axes (which is further discussed below in connection with FIG. 10-13). In other embodiments, proof masses 106(1)-(2) and 108(1)-(2) may detect angular velocity in different directional axes, such as where proof masses 106(1)-(2) detect angular velocity in the X- and Z-directional axes, while proof masses 108(1)-(2) detect angular velocity in the Y-directional axis. Other embodiments may include either proof masses 106(1)-(2) or proof masses 108(1)-(2) independently operating as a sensor to detect angular velocity about a single X-, Y-, or Z-directional axis.

Proof mass 106(1) includes recess 142(1) in the side closest to its paired proof mass 106(2), and proof mass 106(2) includes recess 142(2) in the side closest to its paired proof mass 106(1). Proof mass 108(1) includes recess 144(1) in the side closest to its paired proof mass 108(2), and proof mass 108(2) includes recess 144(2) in the side closest to its paired proof mass 108(1). As referred to herein, a recess (such as recesses 142(1)-(2) and 144(1)-(2)) is a cavity or void or indention or a volume of space located on an edge of the proof mass' outer perimeter that is parallel to the X-Y plane (where the outer perimeter includes the outer sidewalls of the proof mass, as viewed from the top-down view in FIG. 1), within which the proof mass is absent. A recess extends through the proof mass to the top and bottom surfaces of the proof mass that are parallel to the X-Y plane, and includes at least three sidewalls. Various structures are also formed within a recess by a number of openings through the proof mass, where the structures attach to sidewalls of the recess. It is also noted that recesses 142(1)-(2), as well as any structure formed within or between the recesses 142(1)-(2), like a pivot structure or an anchor, are formed by a number of openings in and through proof masses 106(1)-(2). Similarly, recesses 144(1)-(2), as well as any structure formed within or between the recesses 144(1)-(2), are formed by a number of openings in and through proof masses 108(1)-(2). Such openings are further discussed below in connection with FIGS. 2 and 3.

Anchor 110 is formed on the substrate and located between recesses 142(1) and 142(2). Pivot bar 112(1) is coupled to anchor 110 by spring 114(1). One end of pivot bar 112(1) is coupled to a sidewall of recess 142(1) by spring 116(1), and the opposing end of pivot bar 112(1) is coupled to a sidewall of recess 142(2) by spring 116(3). Pivot bar 112(2) is coupled to anchor 110 by spring 114(2). One end of pivot bar 112(2) is coupled to a sidewall of recess 142(1) by spring 116(2), and the opposing end of pivot bar 112(2) is coupled to a sidewall of recess 142(2) by spring 116(4). While pivot bars 112(1)-(2) are shown as straight bars, other shaped bars may be used, such as bars that are bent around anchor 110 by some angle (e.g., like bars 132(1)-(2) further discussed below). Also, while springs 116(1)-(4) are shown as straight springs, other shaped springs may be used, such as U-shaped springs (e.g., like springs 136(1)-(4) further discussed below) or J-shaped springs (e.g., like springs 216(1)-(4), further discussed below in connection with FIG. 2).

Pivot bars 112(1)-(2), springs 114(1)-(2), and springs 116(1)-(4) form a pivot structure for proof masses 106(1)-(2), where the pivot structure moves flexibly about anchor 110 in the Y-directional axis for drive motion (further discussed below in connection with FIGS. 5 and 7), and in the Z-directional axis for sense motion (further discussed below in connection with 8 and 9). Proof masses 106(1) and 106(2) and their respectively attached ends of pivot bars 112(1) and 112(2) move in anti-phase, which is to say they move in opposite directions during drive and sense motion. For example, as proof mass 106(1) moves in one direction of the Y-directional axis (e.g., positive direction), proof mass 106(2) moves in an opposite direction in the Y-directional axis (e.g., negative direction). In other words, proof mass 106(1) and proof mass 106(2) slide back and forth past one another in the Y-directional axis. Similarly, as proof mass 106(1) moves in one direction of the Z-directional axis (e.g., negative direction), proof mass 106(2) moves in an opposite direction of the Z-directional axis (e.g., positive direction). The pivot structure ensures that proof masses 106(1)-(2) have sense motion in the Z-directional axis that is substantially parallel to sense electrodes underlying the proof masses 106(1)-(2), making the sense area where the proof masses 106(1)-(2) overlie the sense electrodes more efficient.

An anchor structure 118(1) is coupled to an outer wall of proof mass 106(1), and one end of a linking structure 120(2) is coupled to an opposing outer wall of proof mass 106(1). An anchor structure 118(2) is coupled to an outer wall of proof mass 106(2) and one end of a linking structure 120(1) is coupled to an opposing outer wall of proof mass 106(2). An opposing end of linking structure 120(2) is coupled to actuator 122(1), and an opposing end of linking structure 120(1) is coupled to actuator 122(2). In the embodiment shown, connection points of the structures 118(1) and 120(2) to the proof mass are aligned with connection points of the pivot structure to form a single axis (e.g., springs of the structures 118(1) and 120(2) are aligned with springs 116(2) and 116(2))). In other embodiments, the connection points are not aligned. Actuators 122(1)-(2) and structures 118(1)-(2) and 120(1)-(2) are further discussed below in connection with FIG. 5.

Actuator 128(1) is coupled to proof mass 108(1) by a linking structure 140(1) on one outer wall and by a linking structure 140(2) on an opposing outer wall of proof mass 108(1). Actuator 128(2) is coupled to proof mass 108(2) by a linking structure 140(3) on one outer wall and by a linking structure 140(4) on an opposing outer wall of proof mass 108(2). In the embodiment shown, connection points of the structures 140(1) and 140(2) to proof mass 108(1) are aligned with one another (e.g., springs of the structures 140(1) and 140(2) are aligned), and connection points of the structures 140(3) and 140(4) are aligned with one another. Actuators 128(1)-(2) and structures 140(1)-(4) are further discussed below in connection with FIG. 6.

In the embodiment shown, actuator 122(1) is coupled to actuator 128(1) by a drive motion linking structure 124(1), and actuator 122(2) is coupled to actuator 128(2) by another drive motion linking structure 124(2). Drive motion linking structure 124(1) is also coupled to anchors 126(1) and 126(2) formed on the substrate, and drive motion linking structure 124(2) is coupled to anchors 126(3) and 126(4) formed on the substrate. Drive motion linking structure 124(1) is configured to couple the drive motion provided by actuators 122(1) and 128(1), and drive motion linking structure 124(2) is configured to couple the drive motion provided by actuators 122(2) and 128(2). It is noted that drive motion linking structures 124(1)-(2) are used in embodiments where it is desirable to achieve a single drive frequency for proof masses 106(1)-(2) and 108(1)-(2).

Anchor 130 is formed on the substrate and located between recesses 144(1) and 144(2) of proof masses 108(1)-(2). Pivot bar 132(1) is coupled to anchor 130 by spring 134(1). One end of pivot bar 132(1) is coupled to a sidewall of recess 144(1) by spring 136(1), and the opposing end of pivot bar 132(1) is coupled to a sidewall of recess 144(2) by spring 136(3). Pivot bar 132(2) is coupled to anchor 130 by spring 134(2). One end of pivot bar 132(2) is coupled to a sidewall of recess 144(1) by spring 136(2), and the opposing end of pivot bar 132(2) is coupled to a sidewall of recess 144(2) by spring 136(4). While pivot bars 132(1)-(2) are shown as bars bent around anchor 130, other shaped bars may be used, such as straight bars (e.g., like bars 112(1)-(2) discussed above). Also, while springs 136(1)-(4) are shown as U-shaped springs, other shaped springs may be used, such as straight springs (e.g., like springs 116(1)-(4) discussed above) or J-shaped springs (e.g., like springs 216(1)-(4), further discussed below in connection with FIG. 2).

Pivot bars 132(1)-(2), springs 134(1)-(2), and springs 136(1)-(4) form a pivot structure for proof masses 108(1)-(2), where the pivot structure moves flexibly about anchor 130 in the Y-directional axis for sense motion (further discussed below in connection with FIG. 13), and in the Z-directional axis for sense motion (further discussed below in connection with 11 and 12). Proof masses 108(1)-(2) are also able to move flexibly toward and away (e.g., tuning fork motion) from the anchor 130 in the X-directional axis for drive motion (further discussed below in connection with FIG. 10). Proof masses 108(1) and 108(2) and their respectively attached ends of pivot bars 132(1) and 132(2) move in anti-phase, which is to say they move in opposite directions during drive and sense motion. For example, as proof mass 108(1) moves in one direction of the Y-directional axis (e.g. positive direction), proof mass 108(2) moves in an opposite direction of the Y-directional axis (e.g., negative direction). Similarly, as proof mass 108(1) moves in one direction of the Z-directional axis (e.g., negative direction), proof mass 108(2) moves in an opposite direction of the Z-directional axis (e.g., positive direction). The pivot structure ensures that proof masses 108(1)-(2) have sense motion in the Z-directional axis that is substantially parallel to sense electrodes underlying the proof masses 108(1)-(2), making the sense area where the proof masses 108(1)-(2) overlie the sense electrodes more efficient.

Proof mass 108(1) is also coupled to a sense structure 138(1) by isolating structures 146(1)-(2), and proof mass 108(2) is coupled to sense structure 138(2) by isolating structures 146(3)-(4). Each sense structure 138(1)-(2) includes a number of sense electrodes that detect motion in the Y-directional axis. Sense structures 138(1)-(2) and isolating structures 146(1)-(4) are further discussed below in connection with FIG. 6.

Figure 2:
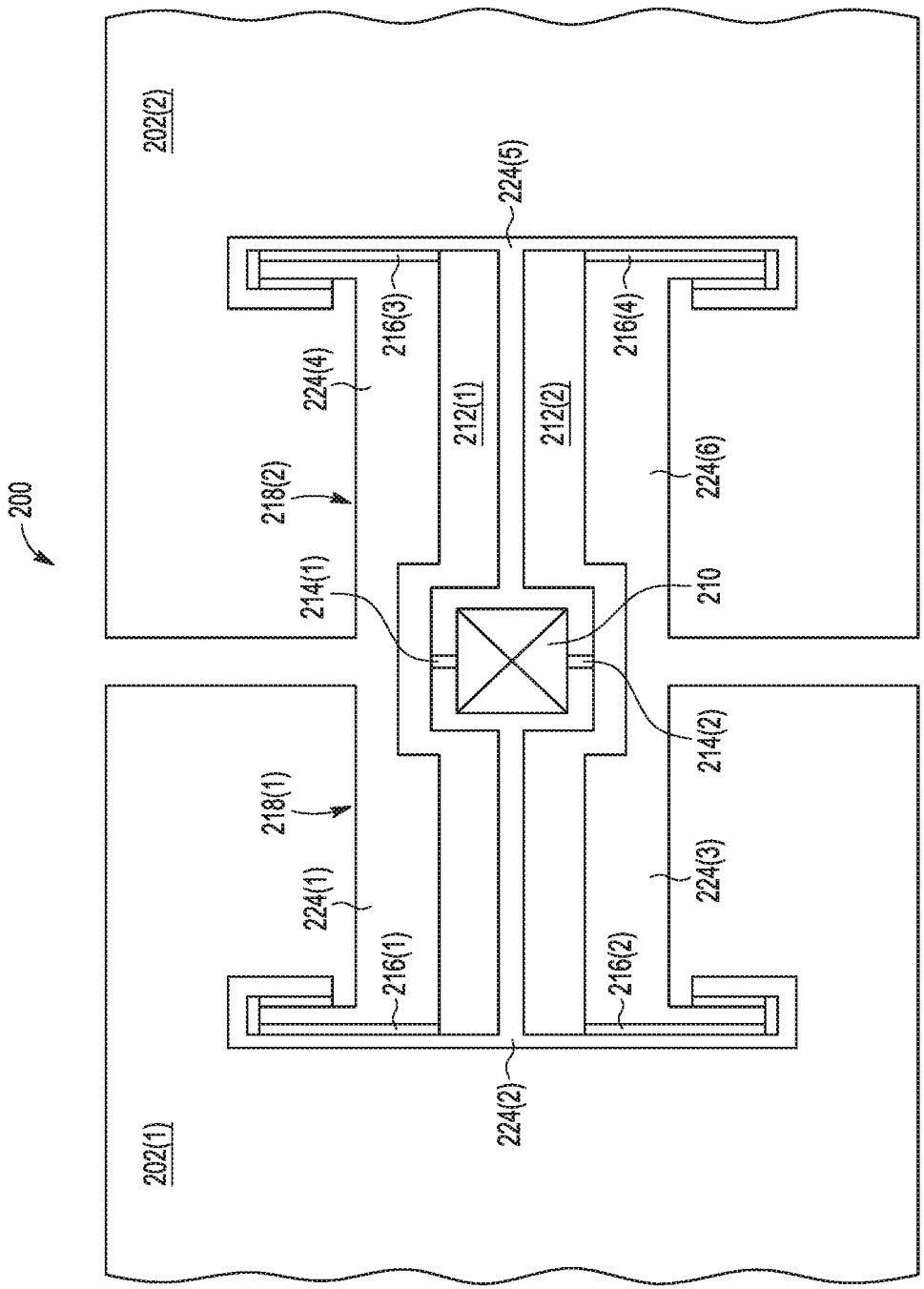
FIGS. 2 and 3 illustrate block diagrams depicting top-down views of example pivot structures of a MEMS device in which the disclosure is implemented, according to some embodiments.

FIG. 2 illustrates a block diagram depicting a top-down view of an example pivot structure 200 of a MEMS device in which the disclosure is implemented. In other embodiments, pivot structure 200 may be used instead of the pivot structure illustrated in FIG. 1 between proof masses 106(1) and 106(2), or may be used instead of the pivot structure illustrated in FIG. 1 between proof masses 108(1) and 108(2).

Anchor 210 is formed on the substrate and located between recesses 218(1) and 218(2) of proof masses 202(1)-(2). Pivot bar 212(1) is coupled to anchor 210 by spring 214(1). One end of pivot bar 212(1) is coupled to a sidewall of recess 218(1) by spring 216(1), and the opposing end of pivot bar 212(1) is coupled to a sidewall of recess 218(2) by spring 216(3). Pivot bar 212(2) is coupled to anchor 210 by spring 214(2). One end of pivot bar 212(2) is coupled to a sidewall of recess 218(1) by spring 216(2), and the opposing end of pivot bar 212(2) is coupled to a sidewall of recess 218(2) by spring 216(4). Pivot bars 212(1)-(2), springs 214(1)-(2), and springs 216(1)-(4) form pivot structure 200, where the pivot structure 200 moves flexibly about anchor 210 in the Y- and Z-directional axes, and proof masses 202(1)-(2) are also able to move flexibly toward and away from the anchor 210 in the X-directional axis, making pivot structure 200 suitable for use as a pivot structure for both proof masses 106(1)-(2) and 108(1)-(2).

It is also noted that recesses 218(1)-(2), as well as pivot structure 200 within the recesses 218(1)-(2) and anchor 210 between the recesses 218(1)-(2), are formed by openings 224(1)-(6) in and through proof masses 202(1)-(2). Additional or fewer openings may be used to form the structures within the recesses in other embodiments. Each opening 224 forms one or more sidewalls of the respective recess 218. In the embodiment shown, recesses 218(1)-(2) have more than 3 sidewalls. For example, additional sidewalls of recess 218(1) are formed around spring 216(1) where a portion of proof mass 202(1) has been further removed (as compared with recess 142(1), for example). Springs 216(1)-(4) each attach to a respective one of proof masses 202(1)-(2) at a sidewall of the respective recess 218(1)-(2).

Figure 3:
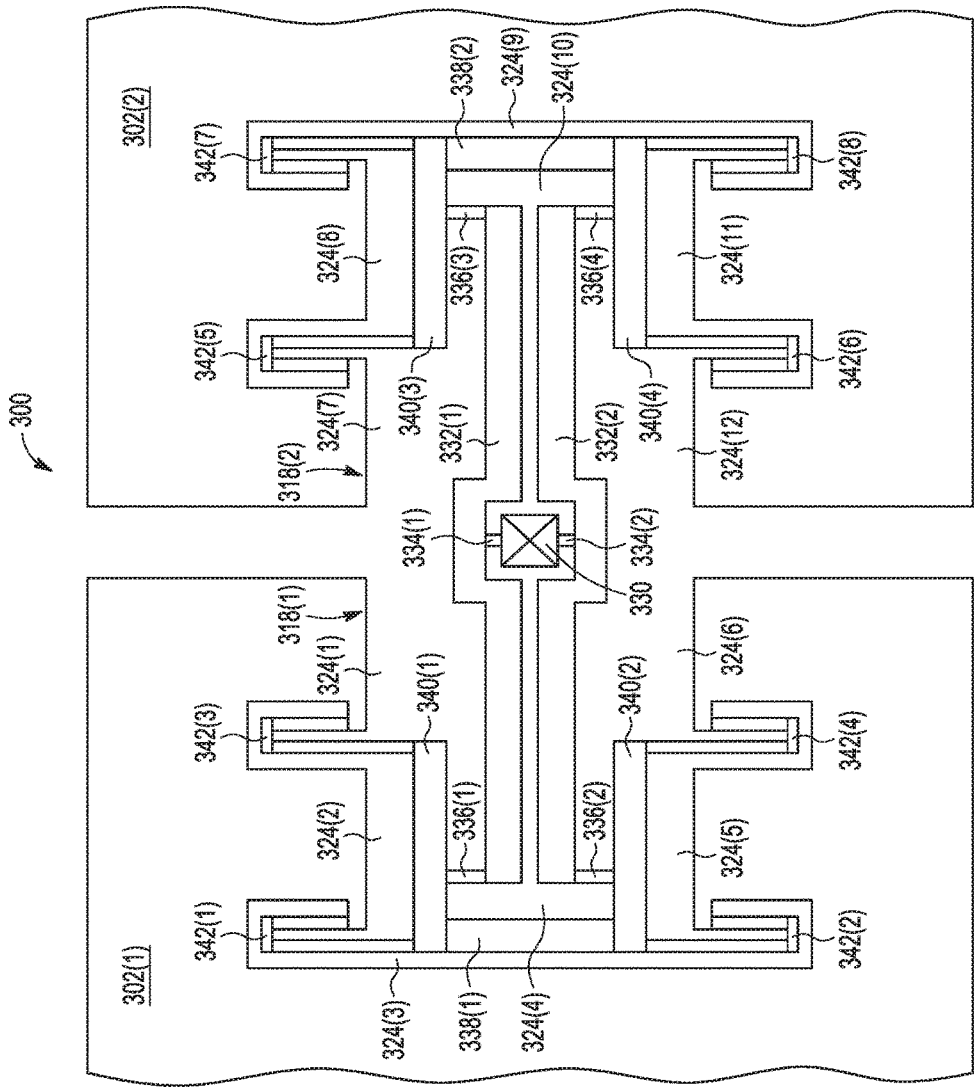

FIG. 3 illustrates a block diagram depicting a top-down view of another example pivot structure 300 of a MEMS device in which the disclosure is implemented. In other embodiments, pivot structure 300 may be used instead of the pivot structure illustrated in FIG. 1 between proof masses 106(1) and 106(2), or may be used instead of the pivot structure illustrated in FIG. 1 between proof masses 108(1) and 108(2).

Anchor 330 is formed on the substrate and located between recesses 318(1) and 318(2) of proof masses 302(1)-(2). Pivot bar 332(1) is coupled to anchor 330 by spring 334(1). Pivot bar 332(2) is coupled to anchor 330 by spring 334(2). The ends of pivot bars 332(1)-(2) are coupled to interior sidewalls of a respective C-shaped linking structure, one such structure formed by horizontal bars 340(1)-(2) and vertical bar 338(1), and another formed by horizontal bars 340(3)-(4) and vertical bar 338(2), where "horizontal" bars and "vertical" bars are used as positional terms with respect to the layout of FIG. 3. In other words, horizontal bars are oriented in the horizontal direction of FIG. 3, and vertical bars are oriented in the vertical direction of FIG. 3. It is also noted that the C-shaped linking structures need not have a physical boundary at the junction of horizontal and vertical bars, since the horizontal and vertical bars may be formed from a single block of semiconductor material. One end of pivot bar 332(1) is coupled to a sidewall of bar 340(1) by spring 336(1), and the opposing end of pivot bar 332(1) is coupled to a sidewall of bar 340(3) by spring 336(3). One end of pivot bar 332(2) is coupled to a sidewall of bar 340(2) by spring 336(2), and the opposing end of pivot bar 332(2) is coupled to a sidewall of bar 340(4) by spring 336(4).

Each C-shaped linking structure is coupled to sidewalls of the respective recess 318(1)-(2) by a number of springs 342. In the embodiment shown, bar 340(1) is coupled to sidewalls of recess 318(1) by springs 342(1) and 342(3), and bar 340(2) is coupled to sidewalls of recess 318(1) by springs 342(2) and 342(4). Bar 340(3) is coupled to sidewalls of recess 318(2) by springs 342(5) and 342(7), and bar 340(4) is coupled to sidewalls of recess 318(2) by springs 342(6) and 342(8).

Pivot bars 332(1)-(2), springs 334(1)-(2), springs 336(1)-(4), bars 340(1)-(4), bars 338(1)-(2), and springs 342(1)-(8) form pivot structure 300, where the pivot structure 300 moves flexibly about anchor 330 in the Y- and Z-directional axes, and proof masses 302(1)-(2) are also able to move flexibly toward and away from the anchor 210 in the X-directional axis, making pivot structure 300 suitable for use as a pivot structure for both proof masses 106(1)-(2) and 108(1)-(2).

It is also noted that recesses 318(1)-(2), as well as pivot structure 300 within the recesses 318(1)-(2) and anchor 330 between the recesses 318(1)-(2), are formed by openings 324(1)-(12) in and through proof masses 302(1)-(2). Additional or fewer openings may be used to form the structures within the recesses in other embodiments. Each opening 324 forms one or more sidewalls of the respective recess 318. In the embodiment shown, recesses 318(1)-(2) have more than 3 sidewalls. For example, additional sidewalls of recess 318(1) are formed around springs 342(1) and 342(3) where a portion of proof mass 302(1) has been further removed (as compared with recess 136(1), for example). Springs 342(1)-(8) each attach to a respective one of proof masses 302(1)-(2) at a sidewall of the respective recess 318(1)-(2).

Figure 4:
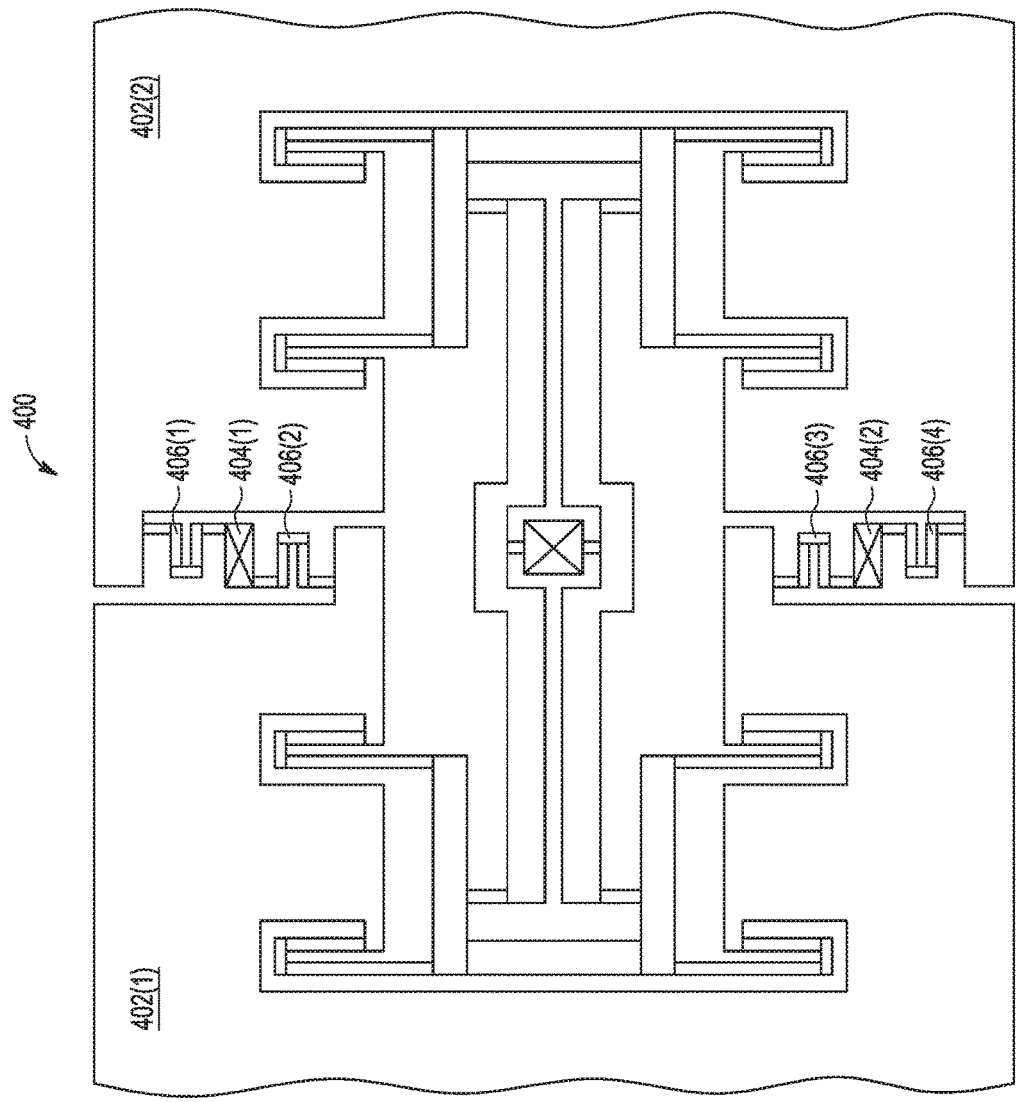
FIG. 4 illustrates a block diagram depicting a top-down view of example common mode drive spring structures of a MEMS device in which the disclosure is implemented, according to some embodiments.

FIG. 4 illustrates a block diagram depicting a top-down view of a pair of example common mode drive spring structures 400 of a MEMS device in which the disclosure is implemented. Common mode drive spring structures 400 are located between a pair of proof masses 402(1)-(2) on either side of a pivot structure between the pair of proof masses 402(1)-(2). Common mode drive spring structures 400 are configured to suppress or minimize common mode drive motion in order to improve efficiency of movement of the proof masses 402(1)-(2). In combination with the pivot structure (like that shown in FIG. 1, 2, or 3) between proof masses 108(1)-(2) of FIG. 1, the common mode drive spring structures 400 ensure that proof masses 108(1)-(2) have sense motion in the Z-directional axis that is substantially parallel to underlying sense electrodes, making the sense area where the proof masses 108(1)-(2) overlap the sense electrodes more efficient. The common mode drive spring structures 400 also ensures that proof masses 402(1)-(2) undergo a drive motion where the proof masses move toward and away from each other. Spring structures 406(1)-(2) are configured such that it has a low resistance to this tuning fork drive motion, whereas when proof masses 402(1)-(2) undergo motions in the same direction (as common mode motion), the structure 400 in cooperation with anchor 404 and spring structures 406 will introduce a large stiffness or resistance.

One common mode drive spring structure 400 includes anchor 404(1) formed on the substrate, spring 406(1) having one end attached to the proof mass 402(2) and an opposing end attached to anchor 404(1), and spring 406(2) having one end attached to the proof mass 402(1) and an opposing end attached to anchor 404(1). Another common mode drive spring structure 400 includes anchor 404(2) formed on the substrate, spring 406(3) having one end attached to the proof mass 402(1) and an opposing end attached to anchor 404(2), and spring 406(4) having one end attached to the proof mass 402(2) and an opposing end attached to anchor 404(2).

Figure 5:
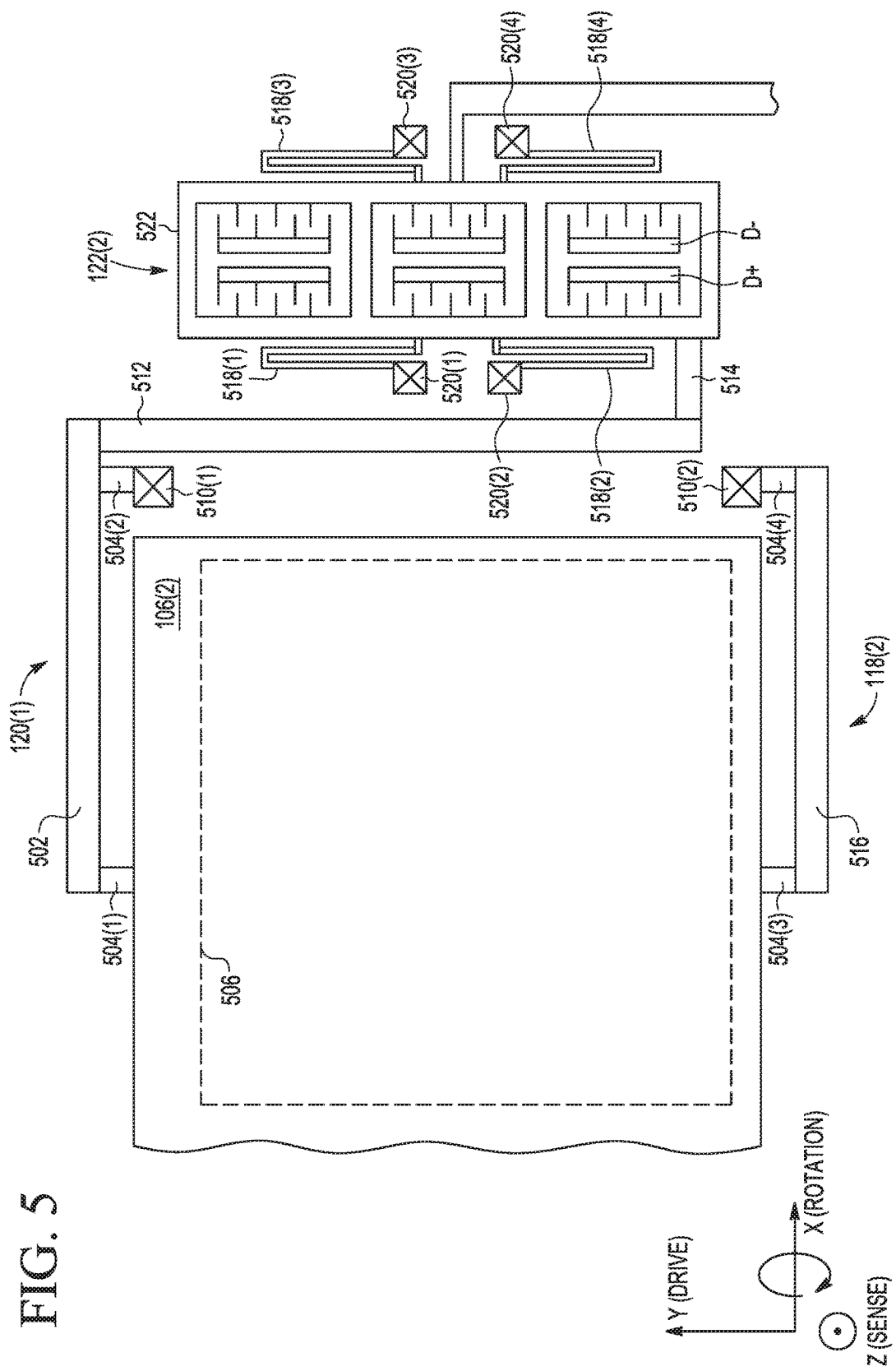
FIGS. 5 and 6 illustrate block diagrams depicting top-down views of example components of a MEMS device in which the disclosure is implemented, according to some embodiments.

FIG. 5 illustrates additional details for components of a MEMS gyroscope device in which the disclosure is implemented, such as for an actuator 122, anchor structure 118, and linking structure 120. While components relative to proof mass 106(2) are shown and discussed in connection with FIG. 5, such discussion is also applicable to the components relative to the other proof mass 106(1).

Actuator 122(2) is configured to produce drive motion for proof mass 106(2) at a drive frequency, such as by converting an electrical signal into physical or mechanical movement. For example, actuator 122(2) is a capacitive mechanism, such as a comb drive having moving combs (illustrated as attached to the interior sidewalls of openings in actuator frame 522) and static combs (illustrated inside of the openings in actuator frame 522) that use electrostatic forces to generate mechanical movement or vibration. The dual static combs provide drive motion in a positive and negative drive direction (illustrated as D+ and D−), which is in the X-directional axis. Actuator frame 522 is also coupled to anchors 520(1)-(4) formed on the substrate via springs 518(1)-(4), which couple actuator 122(2) to the substrate while allowing drive motion generation.

Proof mass 106(2) is coupled to anchor structure 118(2), which includes an anchor 510(2) formed on the substrate, a bar 516 having one end coupled to proof mass 106(2) by spring 504(3) and an opposing end coupled to anchor 510(2) by spring 504(4). Proof mass 106(2) is also coupled to linking structure 120(1), which includes horizontal bar 502 and vertical bar 512. One end of horizontal bar 502 is coupled to an outer side of proof mass 106(2) by spring 504(1), and an opposing end of horizontal bar 502 is coupled to an end of vertical bar 512. An opposing end of vertical bar 512 is coupled to actuator 122(2) by spring or flexible bar 514. A mid-point of linking structure 120(1), such as near the illustrated junction of the horizontal bar 502 and vertical bar 512, is coupled by spring 504(2) to anchor 510(1) formed on the substrate. Drive motion produced by actuator 122(2) in the X-directional axis is transmitted to linking structure 120(1), which pivots around anchor 510(1) and translates the drive motion into the Y-directional axis to proof mass 106(2).

Sense electrode 506 (illustrated as a box with broken lines) is formed on the surface of the substrate and underlies proof mass 106(2). Sense electrode 506 is configured to detect sense movement in the Z-directional axis. It is noted that actuators 122(1) and 122(2) are configured to generate movement that results in anti-phase drive motion of proof masses 106(1) and 106(2) to slide past one another in the Y-directional axis, where proof masses 106(1) and (2) also move toward and away from underlying sense electrodes in anti-phase sense motion (e.g., proof mass 106(1) moves toward its underlying sense electrode while proof mass 106(2) moves away from its underlying sense electrode).

Figure 6:
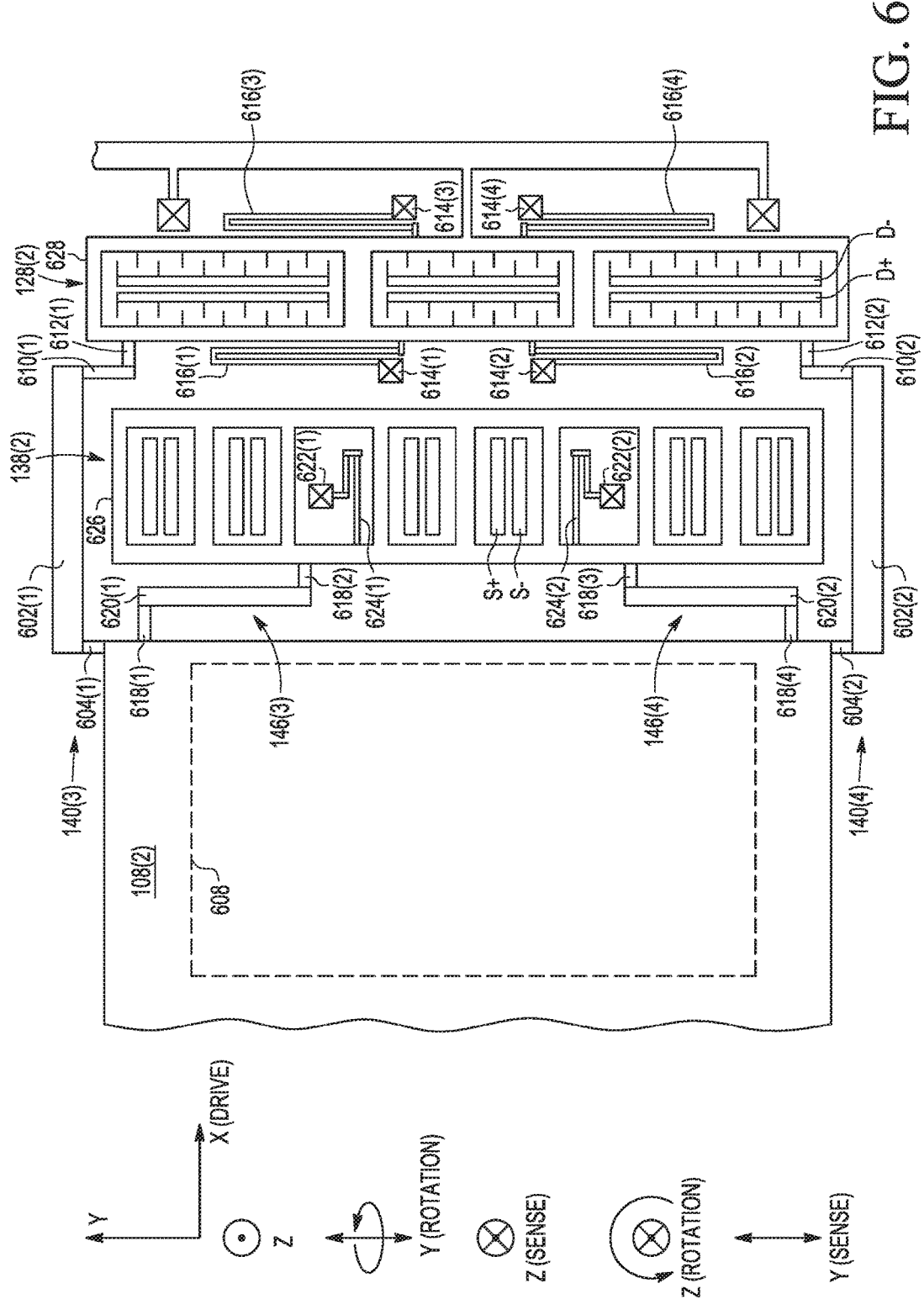

FIG. 6 illustrates additional details for components of a MEMS gyroscope device in which the disclosure is implemented, such as for an actuator 128, sense structure 138, linking structure 140, and isolating structure 146. While components relative to proof mass 108(2) are shown and discussed in connection with FIG. 6, such discussion is also applicable to the components relative to the other proof mass 108(1).

Actuator 128(2) is configured to produce drive motion for proof mass 108(2) at a drive frequency, similar to actuator 122(2), as discussed above in connection with FIG. 5. In the embodiment shown, actuator 128(2) is a comb drive that produces drive motion in the X-directional axis. Actuator frame 628 is coupled to anchors 614(1)-(4) via springs 616(1)-(4), which couple actuator 128(2) to the substrate while allowing drive motion generation.

Proof mass 108(2) is coupled to linking structure 140(3), which includes a horizontal bar 602(1) having one end coupled to proof mass 108(2) by spring 604(1) and an opposing end coupled to vertical bar 610(1), which in turn is coupled to actuator frame 628 by spring or flexible bar 612(1). Proof mass 108(2) is also coupled to linking structure 140(4), which includes horizontal bar 602(2) having one end coupled to proof mass 108(2) by spring 604(2) and an opposing end coupled to vertical bar 610(2), which in turn is coupled to actuator frame 628 by spring or flexible bar 612(2). Drive motion produced by actuator 128(2) in the X-directional axis is transmitted to linking structures 140(3)-(4), which in turn transmits the drive motion in the X-directional axis to proof mass 108(2).

Sense electrode 608 (illustrated as a box with broken lines) is formed on the surface of the substrate and underlies proof mass 108(2). Sense electrode 608 is configured to detect sense movement in the Z-directional axis. It is noted that actuators 128(1) and 128(2) are configured to generate movement that results in anti-phase drive motion of proof masses 108(1) and 108(2) to move toward and away from another in the X-directional axis (e.g., tuning fork motion), where proof masses 108(1) and (2) also move toward and away from underlying sense electrodes in anti-phase sense motion (e.g., proof mass 108(1) moves toward its underlying sense electrode while proof mass 108(2) moves away from its underlying sense electrode).

Proof mass 108(2) is also coupled to a sense frame 626 of sense structure 138(2) by isolating structures 146(3)-(4). Isolating structure 146(3) includes vertical bar 620(1) having one end coupled to proof mass 108(2) by spring 618(1) and an opposing end coupled to an outer wall of sense frame 626 that is closest to proof mass 108(2) by spring 618(2). Isolating structure 146(4) includes vertical bar 620(2) having one end coupled to proof mass 108(2) by spring 618(4) and an opposing end coupled to the outer wall of sense frame 626 by spring 618(3). These isolating structures 146(3)-(4) transfer sense motion from proof mass 108(2) in the Y-directional axis to sense frame 626, but minimize the transfer of sense motion from proof mass 108(2) in the Z-directional axis to sense frame 626. In other words, isolating structures 146(3)-(4) reduce coupling of the sense motion of proof mass 108(2) in the Z-directional axis. Isolating structures 146(3)-(4) also minimize the transfer of drive motion from proof mass 108(2) in the X-directional axis to sense frame 626.

Sense frame 626 includes a number of openings that extend through top and bottom surfaces of sense frame 626. An anchor 622(1) is coupled to an interior sidewall of one opening in sense frame 626 by spring 624(1), and anchor 622(2) is coupled to an interior sidewall of another opening in sense frame 626 by spring 624(2).

The remaining openings of sense frame 626 each surround a pair of sense electrodes that detect motion in positive and negative directions of the Y-directional axis (illustrated as S+ and S−). Each pair of sense electrodes are formed on the surface of the substrate and extend through an opening in sense frame 626. The pair of electrodes are separated from one another by a spacing distance and separated from interior sidewalls of the opening by a sense distance, which changes as the sense motion shifts the sense frame in positive and negative directions in the Y-directional axis.

Figure 7:
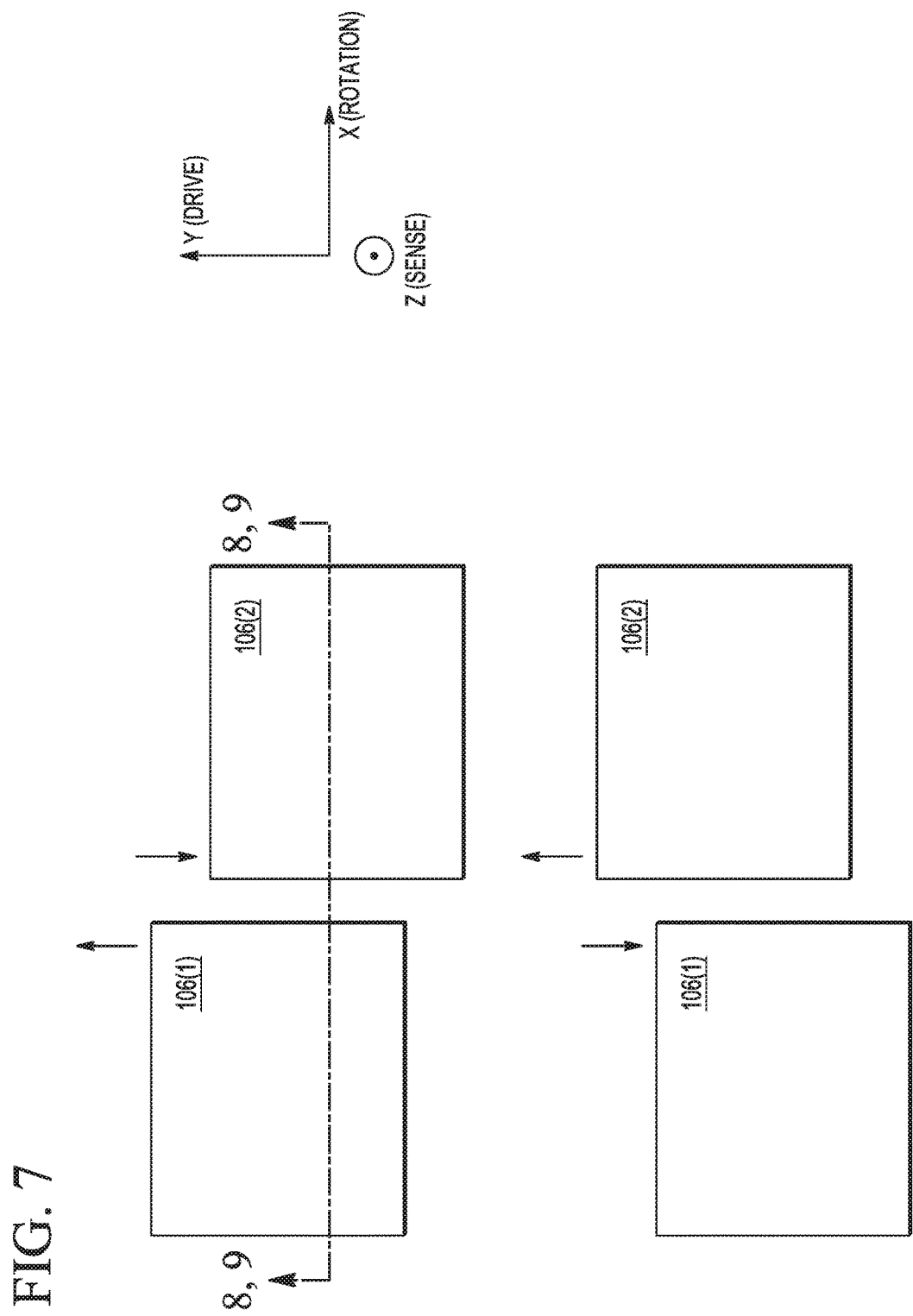
FIGS. 7, 10, and 13 illustrate block diagrams depicting top-down views of example proof mass movement in a MEMS device in which the disclosure is implemented, according to some embodiments.

FIG. 7 illustrates a top-down view of anti-phase drive motion of proof masses 106(1)-(2) in the Y-directional axis (e.g., in opposite directions of the Y-directional axis). In the top portion of FIG. 7, proof mass 106(1) is moving in a positive direction, while proof mass 106(2) is moving in a negative direction. In the bottom portion of FIG. 7, proof mass 106(1) is moving in a negative direction, while proof mass 106(2) is moving in a positive direction. In this manner, proof masses 106(1) and 106(2) slides past one another in the Y-directional axis. The dotted line indicates a central axis common to both proof masses 106(1)-(2) when at rest. The dotted line also indicates a cross-sectional view for FIGS. 8 and 9.

FIG. 8 illustrates a cross-sectional view of proof masses 106(1)-(2), where the Y-directional axis is now shown as going into the page. When proof masses 106(1)-(2) do not experience rotation while being driven, proof masses 106(1)-(2) slide in the Y-directional axis while maintaining a distance 812 above and parallel to their respective sense electrodes 506(1)-(2), which are formed on substrate 810.

Figure 9:
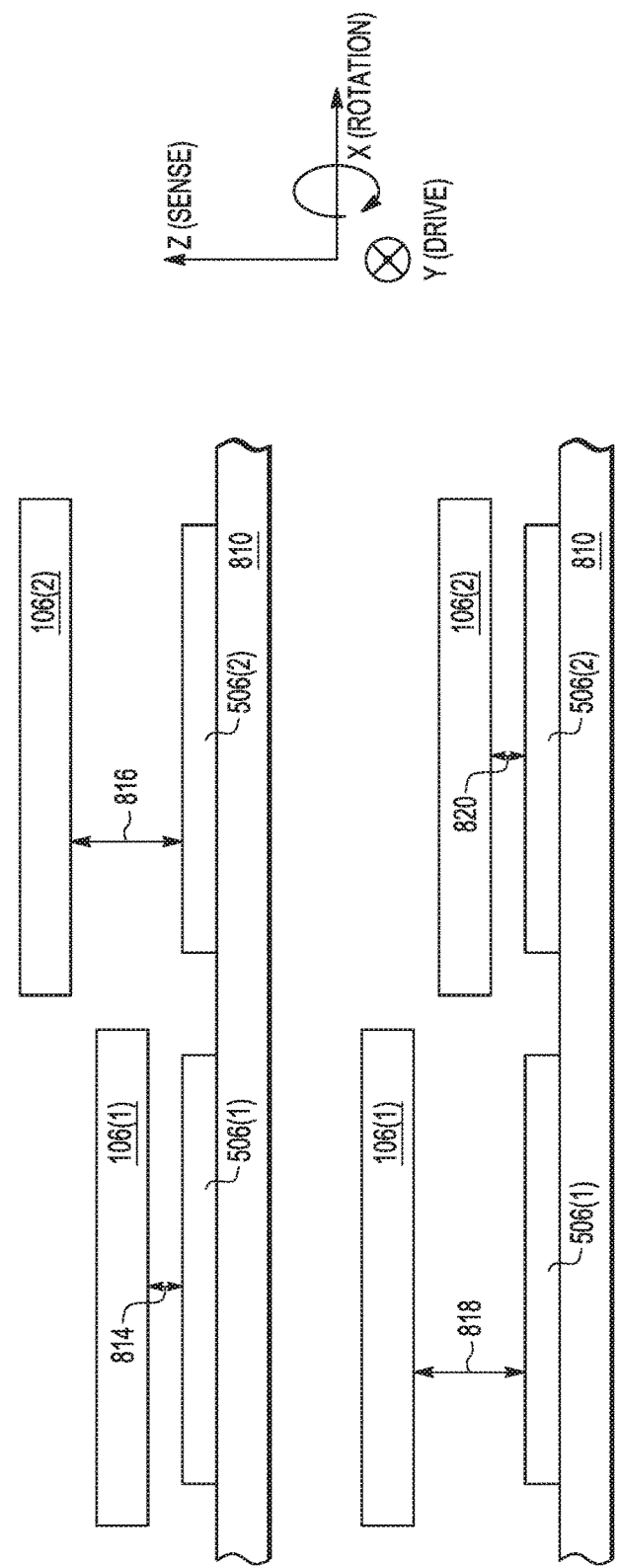

FIG. 9 illustrates a cross-sectional view of anti-phase sense motion of proof masses 106(1)-(2) in the Z-directional axis (e.g., in opposite directions of the Z-directional axis). When proof masses 106(1)-(2) experience rotation in the X-directional axis while being driven, proof masses 106(1)-(2) move in a sense direction orthogonal to the drive direction and the rotation direction, which is in the Z-directional axis in this embodiment.

In the top portion of FIG. 9, proof mass 106(1) is moving in a negative direction toward sense electrode 506(1), which shortens the sense distance 814 between proof mass 106(1) and sense electrode 506(1). Proof mass 106(2) is moving in a positive direction away from sense electrode 506(2), which lengthens the sense distance 816 between proof mass 106(2) and sense electrode 506(2). It is noted that proof masses 106(1)-(2) remain substantially parallel to the surface of the substrate 810 and to the sense electrodes 506(1)-(2) during the anti-phase sense motion, which improves the efficiency of sense detection (e.g., detecting changing capacitance) by sense electrodes 506(1)-(2).

In the bottom portion of FIG. 9, proof mass 106(1) is moving in a positive direction away from sense electrode 506(1), which lengthens the sense distance 818 between proof mass 106(1) and sense electrode 506(1). Proof mass 106(2) is moving in a negative direction toward sense electrode 506(2), which shortens the sense distance 820 between proof mass 106(2) and sense electrode 506(2).

Figure 10:
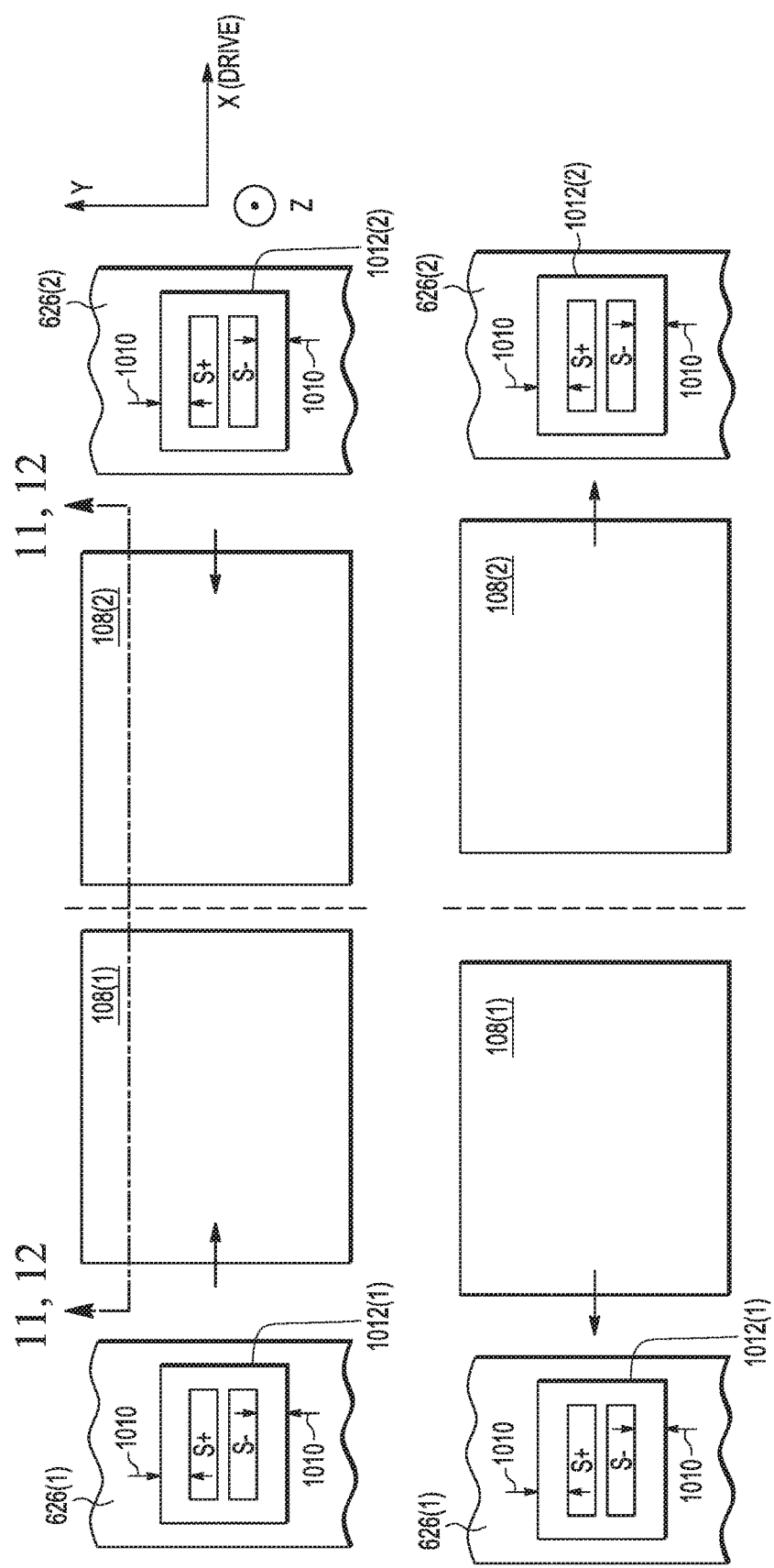

FIG. 10 illustrates a top-down view of anti-phase drive motion of proof masses 108(1)-(2) in the X-directional axis (e.g., in opposite directions of the X-directional axis). Proof mass 108(1) is coupled to sense frame 626(1) and proof mass 108(2) is coupled to sense frame 626(2), as discussed above in connection with FIG. 6. An example opening 1012(1) is illustrated in sense frame 626(1), which surrounds a pair of sense electrodes S+ and S−. An example opening 1012(2) is illustrated in sense frame 626(2), which surrounds a pair of sense electrodes S+ and S−. Sense electrodes S+ and S− are separated from one another by a spacing distance Ds in the Y-directional axis. Each pair of sense electrodes extend up from the underlying substrate through respective openings 1012(1)-(2).

Opening 1012(1) has a sidewall opposite a sensing surface of sense electrode S+ that is parallel to the X-directional axis, where this sidewall is referred to as an S+ sidewall of opening 1012(1). The S+ sidewall may also be referred to as a sidewall that is closest to sense electrode S+. The distance between the S+ sidewall and sense electrode S+ is also referred to as an S+ sense distance. Opening 1012(1) has another sidewall opposite a sensing surface of sense electrode S− that is parallel to the X-directional axis, where this sidewall is referred to as an S− sidewall of opening 1012(1). The S− sidewall may also be referred to as a sidewall closest to sense electrode S−. The distance between the S-sidewall and sense electrode S− is also referred to as an S− sense distance. It is noted that the S+ and S− sidewalls of opening 1012(1) are opposite one another.

In the top portion of FIG. 10, proof mass 108(1) is moving in a positive direction (e.g., to the right), while proof mass 108(2) is moving in a negative direction (e.g., to the left). In the bottom portion of FIG. 10, proof mass 108(1) is moving in a negative direction, while proof mass 108(2) is moving in a positive direction. In this manner, proof masses 108(1) and 108(2) move toward and away from one another in the X-directional axis. The dotted line indicates a cross-sectional view for FIGS. 11 and 12. Since sense frames 626(1)-(2) are coupled to sense motion of respective proof masses 108(1)-(2) in the Y-directional axis and decoupled from drive motion in the X-directional axis (and are also decoupled from sense motion of respective proof masses 108(1)-(2) in the Z-directional axis), a same sense distance 1010 is maintained between each sense electrode and sidewall of openings 1012(1)-(2).

FIG. 11 illustrates a cross-sectional view of proof masses 108(1)-(2), where the Y-directional axis is now shown as going into the page. When proof masses 108(1)-(2) do not experience rotation while being driven, proof masses 108(1)-(2) move in the X-directional axis while maintaining a distance 1112 above and parallel to their respective sense electrodes 608(1)-(2), which are formed on substrate 810.

FIG. 12 illustrates a cross-sectional view of anti-phase sense motion of proof masses 108(1)-(2) in the Z-directional axis (e.g., in opposite directions of the Z-directional axis). Proof masses 108(1)-(2) continue to move toward and away from one another in the X-directional axis as shown in FIG. 10, but such drive motion is not illustrated in FIG. 12 in order to simplify description of the sense motion.

When proof masses 108(1)-(2) experience rotation in the Y-directional axis while being driven, proof masses 108(1)-(2) move in a sense direction orthogonal to the drive direction and the rotation direction, which is in the Z-directional axis in this embodiment. In the top portion of FIG. 12, proof mass 108(1) is moving in a negative direction toward sense electrode 608(1), which shortens the sense distance 1114 between proof mass 108(1) and sense electrode 608(1). Proof mass 106(2) is moving in a positive direction away from sense electrode 608(2), which lengthens the sense distance 1116 between proof mass 108(2) and sense electrode 608(2). It is noted that proof masses 108(1)-(2) remain substantially parallel to the surface of the substrate 810 and to the sense electrodes 608(1)-(2) during the anti-phase sense motion, which improves the efficiency of sense detection (e.g., detecting changing capacitance) by sense electrodes 608(1)-(2).

In the bottom portion of FIG. 12, proof mass 108(1) is moving in a positive direction away from sense electrode 608(1), which lengthens the sense distance 1118 between proof mass 108(1) and sense electrode 608(1). Proof mass 108(2) is moving in a negative direction toward sense electrode 608(2), which shortens the sense distance 1120 between proof mass 108(2) and sense electrode 608(2).

Figure 13:
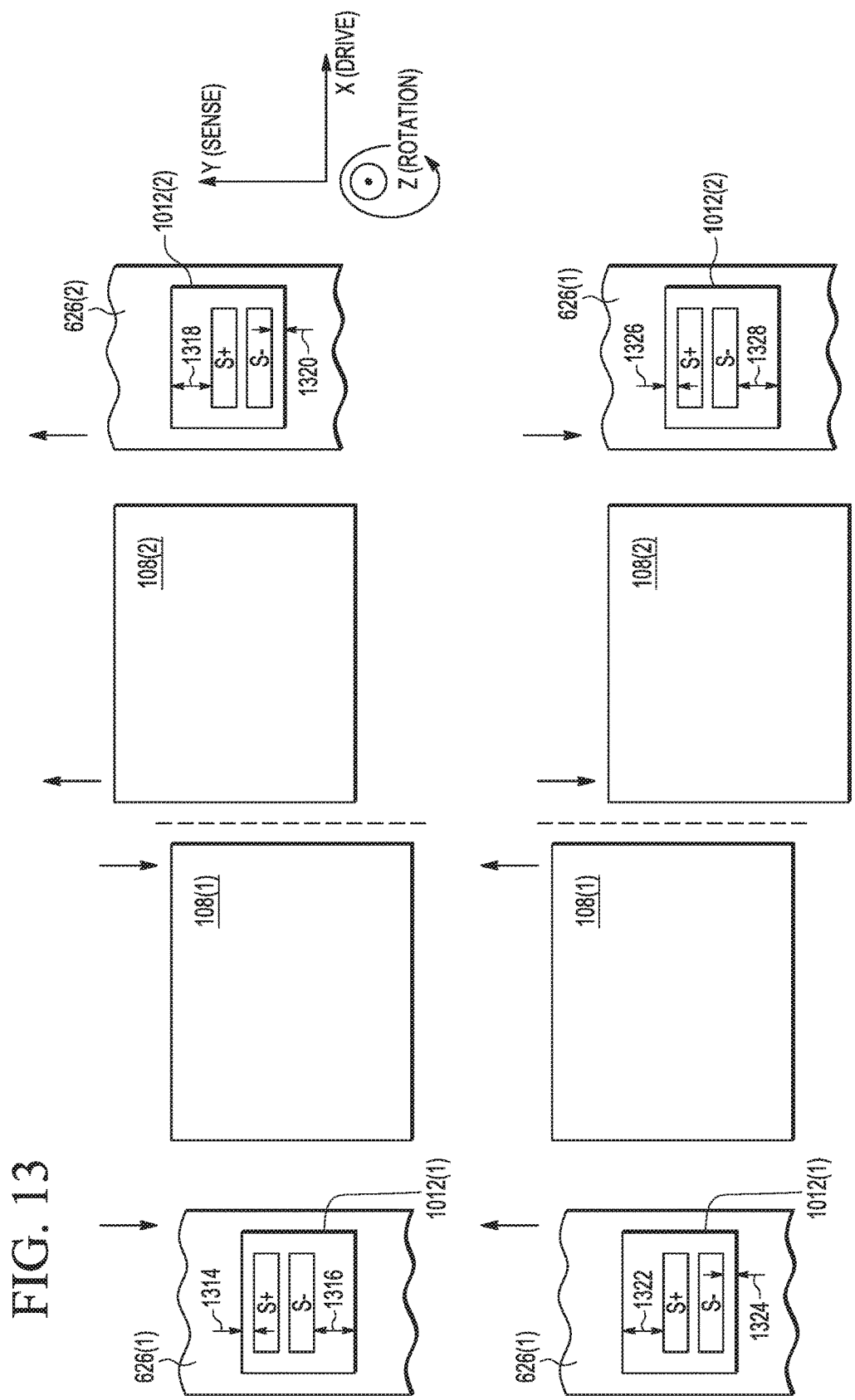

FIG. 13 illustrates a top-down view of anti-phase sense motion of proof masses 108(1)-(2) in the Y-directional axis (e.g., in opposite directions of the Y-directional axis). Proof masses 108(1)-(2) continue to move toward and away from one another in the X-directional axis as shown in FIG. 10, but such drive motion is not illustrated in FIG. 13 in order to simply description of the sense motion.

When proof masses 108(1)-(2) experience rotation in the Z-directional axis while being driven, proof masses 108(1)-(2) move in a sense direction orthogonal to the drive direction and the rotation direction, which is in the Y-directional axis in this embodiment. In the top portion of FIG. 13, proof mass 108(1) is moving in a negative direction of the Y-directional axis. Since sense motion of proof mass 108(1) is coupled to sense frame 626(1), sense frame 626(1) also moves in the negative direction. Opening 1012(1) is similarly shifted in the negative direction and moves the S+ sidewall toward sense electrode S+, which shortens the S+ sense distance 1314 between the S+ sidewall and sense electrode S+. Simultaneously, the S– sidewall moves away from sense electrode S–, which lengthens the S– sense distance 1316 between the S– sidewall and sense electrode S–. Proof mass 108(2) is moving in a positive direction of the Y-directional axis, which also moves sense frame 626(2) in the positive direction since sense motion of proof mass 108(2) is coupled to sense frame 626(2). Opening 1012(2) is similarly shifted in the positive direction and moves the S+ sidewall away from sense electrode S+, which lengthens the S+ sense distance 1318 between the S+ sidewall and sense electrode S+. Simultaneously, the S– sidewall moves toward sense electrode S–, which shortens the S– sense distance 1320 between the S-sidewall and sense electrode S–.

In the bottom portion of FIG. 13, proof mass 108(1) is moving in a positive direction of the Y-directional axis, which also shifts opening 1012(1) in the positive direction. The S+ sidewall moves away from sense electrode S+ and the S– sidewall moves toward sense electrode S–, which lengthens the S+ sense distance 1322 and shortens the S– sense distance 1324. Proof mass 108(2) is moving in a negative direction of the Y-directional axis, which also shifts opening 1012(2) in the negative direction. The S+ sidewall moves toward sense electrode S+ and the S– sidewall moves away from sense electrodes S–, which shortens the S+ sense distance 1326 and lengthens the S– sense distance 1328.

By now it should be appreciated that there has been provided embodiments of a MEMS gyroscope device that is movable in three axes to measure angular velocity in three axes, which includes a first pair of proof masses that each have a recess to which a pivot structure is coupled, the first pair of proof masses are driven to slide back and forth past one another in a first in-plane directional axis (e.g., in the Y-directional axis), and a second pair of proof masses that each have a recess to which another pivot structure is coupled, the second pair of proof masses are driven to move toward and away from one another (e.g., tuning fork vibration) in a second in-plane directional axis (e.g., in the X-directional axis) perpendicular to the first in-plane directional axis.

In one embodiment of the present disclosure, a microelectromechanical system (MEMS) gyroscope device is provided, which includes: a substrate having a surface parallel to a plane; a first proof mass and a second proof mass positioned in space above the surface of the substrate and driven to slide back and forth past one another in a first directional axis of the plane, wherein the first proof mass has a first recess in a side closest to the second proof mass, and the second proof mass has a second recess in a side closest to the first proof mass; a first pivot structure having one end coupled to the first proof mass within the first recess and an opposite end coupled to the second proof mass within the second recess; a first anchor on the surface of the substrate, the first anchor located between the first and second recesses and coupled to a mid-point of the first pivot structure; and a third proof mass and a fourth proof mass positioned in space above the surface of the substrate and driven to move toward and away from one another in a second directional axis of the plane that is perpendicular to the first directional axis; wherein the first and second proof masses move in a third directional axis that is normal to the plane in response to angular velocity in the second directional axis, and the third and fourth proof masses move in the third directional axis in response to angular velocity in the first directional axis.

One aspect of the above embodiment provides that the third and fourth proof masses move in the first directional axis in response to angular velocity in the third directional axis.

Another aspect of the above embodiment provides that the MEMS device further includes: a first actuator and a second actuator respectively coupled to the first and second proof masses and respectively configured to drive the first and second proof masses in opposite directions of the first directional axis; and a third actuator and a fourth actuator respectively coupled to the third and fourth proof masses and respectively configured to drive the third and fourth proof masses in opposite directions of the second directional axis.

A further aspect of the above embodiment provides that the MEMS device further includes: a first drive motion linking structure coupled to the first and third actuators, the first drive motion linking structure configured to couple drive motion provided by the first and third actuators; and a second drive motion linking structure coupled to the second and fourth actuators, the second drive motion linking structure configured to couple drive motion provided by the second and fourth actuators.

Another aspect of the above embodiment provides that a same drive frequency is utilized to drive the first, second, third, and fourth proof masses.

Another aspect of the above embodiment provides that the first pivot structure includes: a first pivot bar having a mid-point coupled to the first anchor by a first spring, a first end coupled to a first sidewall of the first recess of the first proof mass by a second spring, and a second end coupled to a first sidewall of the second recess of the second proof mass by a third spring, and a second pivot bar having a mid-point coupled to the first anchor by a fourth spring, a first end coupled to a second sidewall of the first recess of the first proof mass by a fifth spring, and a second end coupled to a second sidewall of the second recess of the second proof mass by a sixth spring.

Another aspect of the above embodiment provides that the first pivot structure is configured to move flexibly about the first anchor in the first directional axis and in the third directional axis, wherein opposite ends of the first pivot structure are configured to move in opposite directions in the first directional axis and are configured to move in opposite directions in the third directional axis.

Another aspect of the above embodiment provides that the MEMS device further includes: a second pivot structure, wherein the third proof mass has a third recess in a side closest to the fourth proof mass, and the fourth proof mass has a fourth recess in a side closest to the third proof mass, and the second pivot structure has one end coupled to the third proof mass within the third recess and an opposite end coupled to the fourth proof mass within the fourth recess; and a second anchor on the surface of the substrate, the second anchor located between the third and fourth recesses and coupled to a mid-point of the second pivot structure.

A further aspect of the above embodiment provides that the second pivot structure includes: a first pivot bar having a mid-point coupled to the second anchor by a first spring, a first end coupled to a first sidewall of the third recess of the third proof mass by a second spring, and a second end coupled to a first sidewall of the fourth recess of the fourth proof mass by a third spring, and a second pivot bar having a mid-point coupled to the second anchor by a fourth spring, a first end coupled to a second sidewall of the third recess of the third proof mass by a fifth spring, and a second end coupled to a second sidewall of the fourth recess of the fourth proof mass by a sixth spring.

Another further aspect of the above embodiment provides that the second pivot structure includes: a first pivot bar having a mid-point coupled to the anchor by a first spring, a first end coupled to a first linking structure by a second spring, and a second end coupled to a second linking structure by a third spring, a second pivot bar having a mid-point coupled to the anchor by a fourth spring, a first end coupled to the first linking structure by a fifth spring, and a second end coupled to the second linking structure by a sixth spring, the first linking structure coupled to the third proof mass within the third recess by a first plurality of springs, and the second linking structure coupled to the fourth proof mass within the fourth recess by a second plurality of springs.

Another aspect of the above embodiment provides that the MEMS device further includes: a common mode drive spring structure between the third and fourth proof masses, the common mode drive spring structure including: a second anchor, a first spring having one end coupled to the second anchor and another end coupled to the third proof mass, and a second spring having one end coupled to the second anchor and another end coupled to the fourth proof mass.

Another aspect of the above embodiment provides that the MEMS device further includes: a first linking structure coupled between the second proof mass and an actuator, the first linking structure includes an L-shaped bar, a mid-section of the L-shaped bar coupled to a second anchor near a corner of the second proof mass on a side of the second proof mass farthest away from the first proof mass, one end of the L-shaped bar coupled to the second proof mass by a first spring and an opposite end of the L-shaped bar coupled to the actuator by a second spring, the actuator configured to provide drive motion in the second directional axis and the first linking structure configured to flexibly pivot about the second anchor and move the second proof mass in the first directional axis.

Another aspect of the above embodiment provides that the MEMS device further includes: a first sense electrode and a second sense electrode on the surface of the substrate and respectively underneath and separated from the first and second proof masses by first and second distances in the third directional axis, and a third sense electrode and a fourth sense electrode on the surface of the substrate and respectively underneath and separated from the third and fourth proof masses by third and fourth distances in the third directional axis.

A further aspect of the above embodiment provides that the first and second proof masses are configured to move in opposite directions in the third directional axis in response to the angular velocity in the second directional axis, and the first and second proof masses remain substantially in parallel with the first and second sense electrodes as the first and second proof masses respectively move toward and away from the first and second electrodes in response to the angular velocity in the second directional axis.

Another further aspect of the above embodiment provides that the third and fourth proof masses are configured to move in opposite directions in the third directional axis in response to the angular velocity in the first directional axis, and the third and fourth proof masses remain substantially in parallel with the third and fourth sense electrodes as the third and fourth proof masses respectively move toward and away from the third and fourth electrodes in response to the angular velocity in the first directional axis.

Another aspect of the above embodiment provides that the MEMS device further includes: an actuator coupled to the fourth proof mass by a first linking bar and a second linking bar; a sense frame coupled to the fourth proof mass by a first isolating bar and a second isolating bar, wherein the first and second linking bars do not contact the sense frame, and the sense frame is isolated from drive motion provided by the actuator; and a first sense electrode and a second sense electrode on the surface of the substrate, separated from one another by a spacing distance in the first directional axis, the first and second electrodes extend through an opening in the sense frame, wherein the first and second sense electrodes are respectively separated from a first and second sidewall of the opening by a first and second distance in the first directional axis, the second sidewall is opposite the first sidewall.

Another aspect of the above embodiment provides that the first, second, third, and fourth proof masses lie in a common plane that is parallel to the surface of the substrate, the first proof mass has a first side that is closest to the second proof mass and a second side that is closest to the third proof mass, the second side is perpendicular to the first side in the common plane, and the fourth proof mass has a third side that is closest to the third proof mass and a fourth side that is closest to the second proof mass, the fourth side is perpendicular to the first side in the common plane.

In another embodiment of the present disclosure a method for operating a microelectromechanical system (MEMS) gyroscope device is provided, the method including: driving a first pair of proof masses of the gyroscope to slide back and forth past one another in a first directional axis of a plane parallel to a surface of a substrate of the gyroscope, wherein the first pair of proof masses each have a respective recess, a respective end of a pivot structure is coupled to each of the first pair of proof masses within the respective recess, and a mid-point of the pivot structure is coupled to an anchor between the respective recesses; driving a second pair of proof masses of the gyroscope to move toward and away from one another in a second directional axis of the plane that is perpendicular to the first directional axis; in response to angular velocity experienced by the first pair of proof masses in the second directional axis, detecting movement of the first pair of proof masses in a third directional axis that is normal to the plane; and in response to angular velocity experienced by the second pair of proof masses in the first directional axis, detecting movement of the second pair of proof masses in the third directional axis.

One aspect of the above embodiment provides that the method further includes: in response to angular velocity experienced by the second pair of proof masses in the third directional axis, detecting movement of the second pair of proof masses in the first directional axis.

Another aspect of the above embodiment provides that the first pair of proof masses are configured to move in opposite directions in the third directional axis in response to the angular velocity in the second directional axis, the first pair of proof masses remain substantially in parallel with a first pair of sense electrodes as the first pair of proof masses respectively move toward and away from the first pair of sense electrodes in response to the angular velocity in the second directional axis, the second pair of proof masses are configured to move in opposite directions in the third directional axis in response to the angular velocity in the first directional axis, and the second pair of proof masses remain substantially in parallel with a second pair of sense electrodes as the second pair of proof masses respectively move toward and away from the second pair of sense electrodes in response to the angular velocity in the first directional axis.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

As used herein the terms "substantial" and "substantially" mean sufficient to accomplish the stated purpose in a practical manner and that minor imperfections, if any, are not significant for the stated purpose.

Although the invention is described herein with reference to specific embodiments, various modifications and changes can be made without departing from the scope of the present invention as set forth in the claims below. For example, additional or fewer proof masses may be implemented in the MEMS gyroscope device of FIG. 1 in other embodiments, the drive motion linking structures may be present or absent in other embodiments, and the common mode drive spring structures may be present or absent in other embodiments. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A microelectromechanical system (MEMS) gyroscope device comprising:
   a substrate having a surface parallel to a plane;
   a first proof mass and a second proof mass positioned in space above the surface of the substrate and driven to slide back and forth past one another in a first directional axis of the plane, wherein
      the first proof mass has a first recess in a side closest to the second proof mass, and
      the second proof mass has a second recess in a side closest to the first proof mass;
   a first pivot structure having one end coupled to the first proof mass within the first recess and an opposite end coupled to the second proof mass within the second recess;
   a first anchor on the surface of the substrate, the first anchor located between the first and second recesses and coupled to a mid-point of the first pivot structure; and
   a third proof mass and a fourth proof mass positioned in space above the surface of the substrate and driven to move toward and away from one another in a second directional axis of the plane that is perpendicular to the first directional axis;
   wherein
      the first and second proof masses move in a third directional axis that is normal to the plane in response to angular velocity in the second directional axis, and
      the third and fourth proof masses move in the third directional axis in response to angular velocity in the first directional axis;
   a first actuator and a second actuator respectively coupled to the first and second proof masses and respectively configured to drive the first and second proof masses in opposite directions of the first directional axis;
   a third actuator and a fourth actuator respectively coupled to the third and fourth proof masses and respectively configured to drive the third and fourth proof masses in opposite directions of the second directional axis;
   a first drive motion linking structure coupled to the first and third actuators, the first drive motion linking structure configured to couple drive motion provided by the first and third actuators; and
a second drive motion linking structure coupled to the second and fourth actuators, the second drive motion linking structure configured to couple drive motion provided by the second and fourth actuators.

2. The MEMS device of claim 1, wherein
the third and fourth proof masses move in the first directional axis in response to angular velocity in the third directional axis.

3. The MEMS device of claim 1, wherein a same drive frequency is utilized to drive the first, second, third, and fourth proof masses.

4. The MEMS device of claim 1, wherein
the first pivot structure comprises:
   a first pivot bar having a mid-point coupled to the first anchor by a first spring, a first end coupled to a first sidewall of the first recess of the first proof mass by a second spring, and a second end coupled to a first sidewall of the second recess of the second proof mass by a third spring, and
   a second pivot bar having a mid-point coupled to the first anchor by a fourth spring, a first end coupled to a second sidewall of the first recess of the first proof mass by a fifth spring, and a second end coupled to a second sidewall of the second recess of the second proof mass by a sixth spring.

5. The MEMS device of claim 1, wherein
the first pivot structure is configured to move flexibly about the first anchor in the first directional axis and in the third directional axis, wherein opposite ends of the first pivot structure are configured to move in opposite directions in the first directional axis and are configured to move in opposite directions in the third directional axis.

6. The MEMS device of claim 1, further comprising:
a second pivot structure, wherein
   the third proof mass has a third recess in a side closest to the fourth proof mass, and
   the fourth proof mass has a fourth recess in a side closest to the third proof mass, and
   the second pivot structure has one end coupled to the third proof mass within the third recess and an opposite end coupled to the fourth proof mass within the fourth recess; and
a second anchor on the surface of the substrate, the second anchor located between the third and fourth recesses and coupled to a mid-point of the second pivot structure.

7. The MEMS device of claim 6, wherein
the second pivot structure comprises:
   a first pivot bar having a mid-point coupled to the second anchor by a first spring, a first end coupled to a first sidewall of the third recess of the third proof mass by a second spring, and a second end coupled to a first sidewall of the fourth recess of the fourth proof mass by a third spring, and
   a second pivot bar having a mid-point coupled to the second anchor by a fourth spring, a first end coupled to a second sidewall of the third recess of the third proof mass by a fifth spring, and a second end coupled to a second sidewall of the fourth recess of the fourth proof mass by a sixth spring.

8. The MEMS device of claim 6, wherein
the second pivot structure comprises:
   a first pivot bar having a mid-point coupled to the anchor by a first spring, a first end coupled to a first linking structure by a second spring, and a second end coupled to a second linking structure by a third spring,
   a second pivot bar having a mid-point coupled to the anchor by a fourth spring, a first end coupled to the first linking structure by a fifth spring, and a second end coupled to the second linking structure by a sixth spring,
   the first linking structure coupled to the third proof mass within the third recess by a first plurality of springs, and
   the second linking structure coupled to the fourth proof mass within the fourth recess by a second plurality of springs.

9. The MEMS device of claim 1, further comprising:
a common mode drive spring structure between the third and fourth proof masses, the common mode drive spring structure comprising:
   a second anchor,
   a first spring having one end coupled to the second anchor and another end coupled to the third proof mass, and
   a second spring having one end coupled to the second anchor and another end coupled to the fourth proof mass.

10. The MEMS device of claim 1, further comprising:
a first linking structure coupled between the second proof mass and an actuator, the first linking structure comprises an L-shaped bar, a mid-section of the L-shaped bar coupled to a second anchor near a corner of the second proof mass on a side of the second proof mass farthest away from the first proof mass, one end of the L-shaped bar coupled to the second proof mass by a first spring and an opposite end of the L-shaped bar coupled to the actuator by a second spring, the actuator configured to provide drive motion in the second directional axis and the first linking structure configured to flexibly pivot about the second anchor and move the second proof mass in the first directional axis.

11. The MEMS device of claim 1, further comprising:
a first sense electrode and a second sense electrode on the surface of the substrate and respectively underneath and separated from the first and second proof masses by first and second distances in the third directional axis, and
a third sense electrode and a fourth sense electrode on the surface of the substrate and respectively underneath and separated from the third and fourth proof masses by third and fourth distances in the third directional axis.

12. The MEMS device of claim 11, wherein
the first and second proof masses are configured to move in opposite directions in the third directional axis in response to the angular velocity in the second directional axis, and
the first and second proof masses remain substantially in parallel with the first and second sense electrodes as the first and second proof masses respectively move toward and away from the first and second electrodes in response to the angular velocity in the second directional axis.

13. The MEMS device of claim 11, wherein
the third and fourth proof masses are configured to move in opposite directions in the third directional axis in response to the angular velocity in the first directional axis, and
the third and fourth proof masses remain substantially in parallel with the third and fourth sense electrodes as the third and fourth proof masses respectively move toward and away from the third and fourth electrodes in response to the angular velocity in the first directional axis.

14. The MEMS device of claim 1, further comprising:
an actuator coupled to the fourth proof mass by a first linking bar and a second linking bar;
a sense frame coupled to the fourth proof mass by a first isolating bar and a second isolating bar, wherein
the first and second linking bars do not contact the sense frame, and
the sense frame is isolated from drive motion provided by the actuator; and
a first sense electrode and a second sense electrode on the surface of the substrate, separated from one another by a spacing distance in the first directional axis, the first and second electrodes extend through an opening in the sense frame, wherein
the first and second sense electrodes are respectively separated from a first and second sidewall of the opening by a first and second distance in the first directional axis, the second sidewall is opposite the first sidewall.

15. The MEMS device of claim 1, wherein
the first, second, third, and fourth proof masses lie in a common plane that is parallel to the surface of the substrate,
the first proof mass has a first side that is closest to the second proof mass and a second side that is closest to the third proof mass, the second side is perpendicular to the first side in the common plane, and
the fourth proof mass has a third side that is closest to the third proof mass and a fourth side that is closest to the second proof mass, the fourth side is perpendicular to the first side in the common plane.

* * * * *